No. 612,681. Patented Oct. 18, 1898.
H. P. SNOW.
TELEPHONE EXCHANGE MECHANISM.
(Application filed Nov. 1, 1897.)
(No Model.) 4 Sheets—Sheet 1.
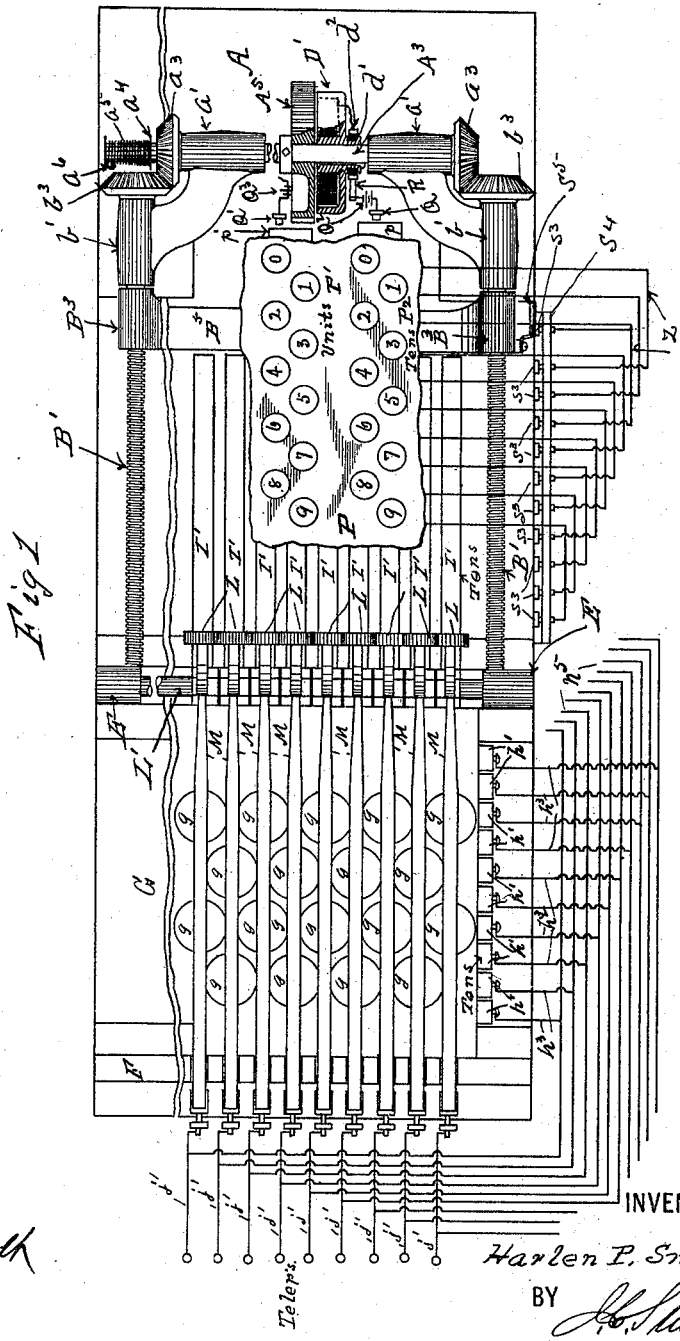
WITNESSES:
Fred Einfeldt
T. J. Barrett
INVENTOR
Harlen P. Snow
BY
H. Sturgeon
ATTORNEY No. 612,681. Patented Oct. 18, 1898.
H. P. SNOW.
TELEPHONE EXCHANGE MECHANISM.
(Application filed Nov. 1, 1897.)
(No Model.) 4 Sheets—Sheet 2.
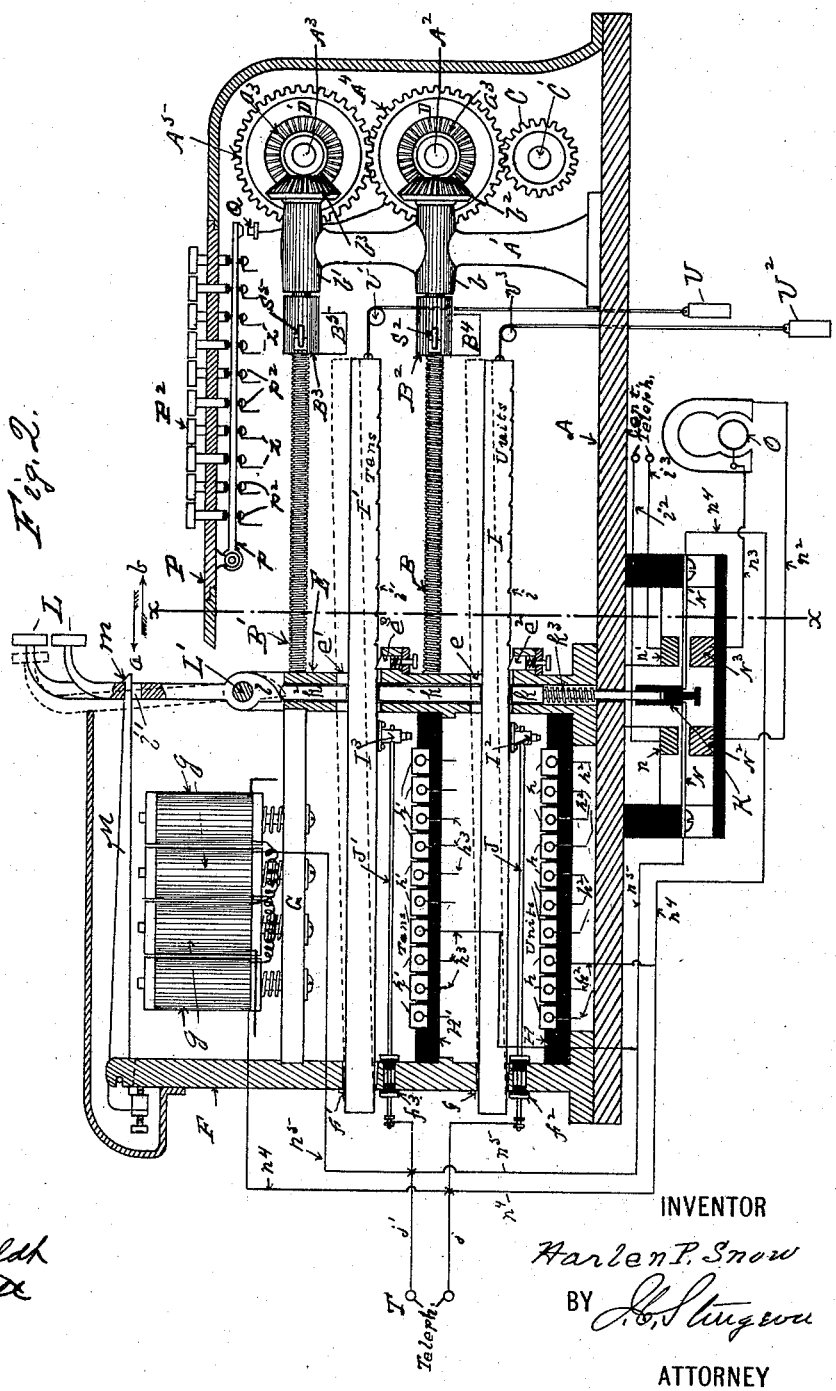
WITNESSES: INVENTOR
Harlen P. Snow
BY
ATTORNEY

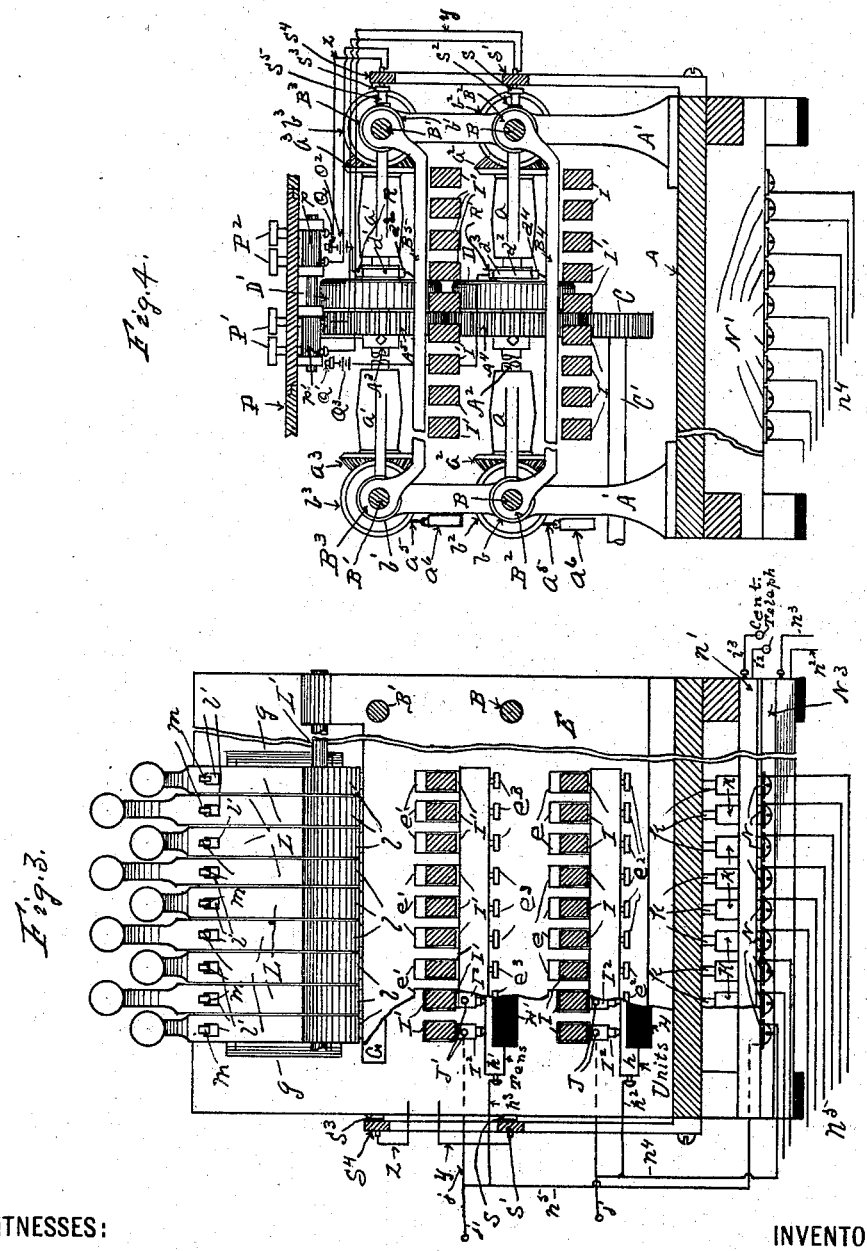

No. 612,681. Patented Oct. 18, 1898.
H. P. SNOW.
TELEPHONE EXCHANGE MECHANISM.
(Application filed Nov. 1, 1897.)
(No Model.)
4 Sheets—Sheet 4.
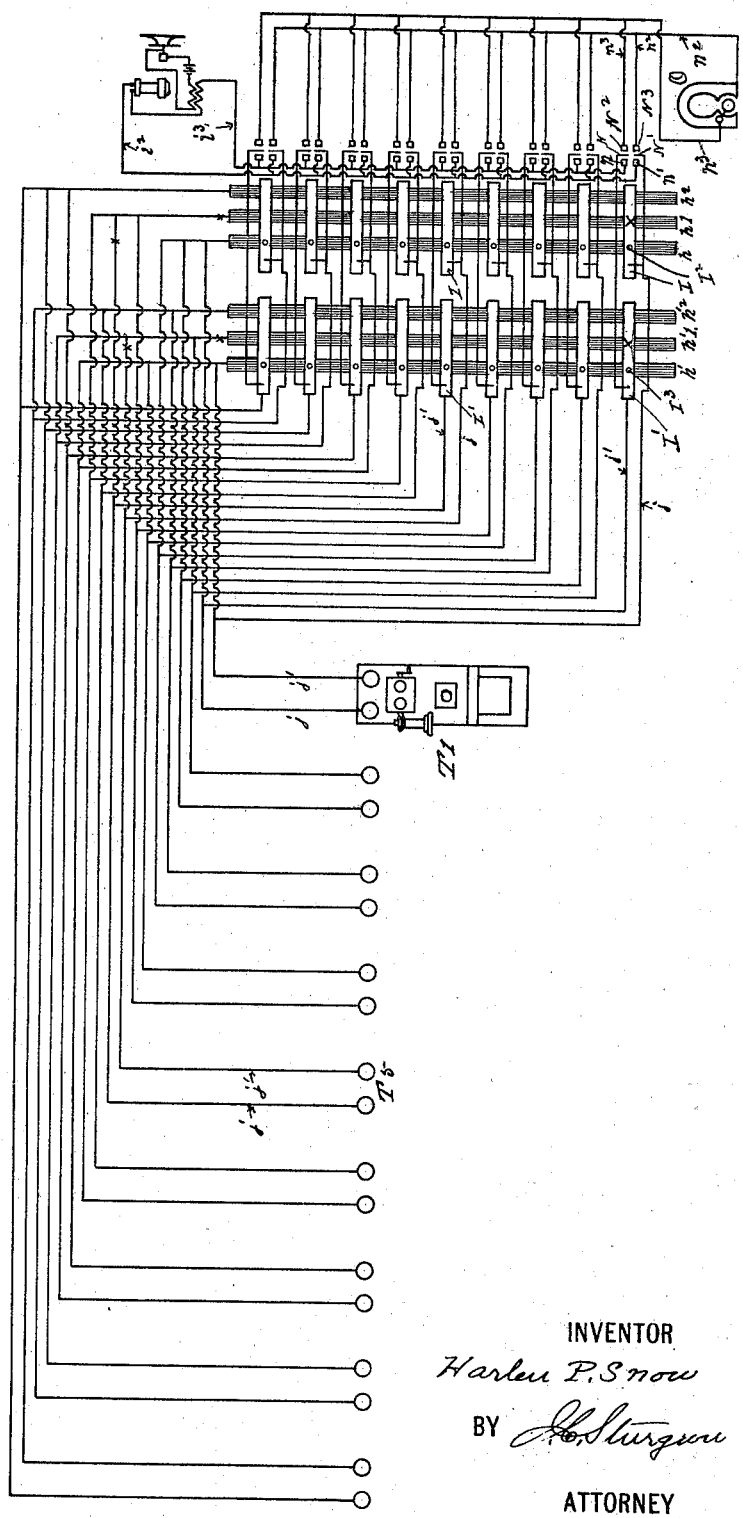
WITNESSES:
INVENTOR
Harlen P. Snow
BY
ATTORNEY

UNITED STATES PATENT OFFICE.

HARLEN P. SNOW, OF ERIE, PENNSYLVANIA, ASSIGNOR OF ONE-HALF TO FREDERICK C. JARECKI, OF SAME PLACE.

TELEPHONE-EXCHANGE MECHANISM.

SPECIFICATION forming part of Letters Patent No. 612,681, dated October 18, 1898.

Application filed November 1, 1897. Serial No. 657,033. (No model.)

*To all whom it may concern:*

Be it known that I, HARLEN P. SNOW, a citizen of the United States, residing at the city of Erie, in the county of Erie and State of Pennsylvania, have invented certain new and useful Improvements in Telephone-Exchange Mechanism; and I do hereby declare the following to be a full, clear, and exact description of the invention, such as will enable others skilled in the art to which it appertains to make and use the same, reference being had to the accompanying drawings, and to the letters and numerals of reference marked thereon, forming part of this specification.

This invention relates to improvements in telephone-exchange mechanism; and it consists substantially in the mechanism for automatically connecting telephone-circuits illustrated by the accompanying drawings, the several views embodying portions only of a complete exchange mechanism, which ordinarily comprises sufficient drops and circuit connections for one hundred telephones. The drawings, however, show the two sets of keys of ten each complete, and the connections are made by the combined use of the keys in each series, which are hereinafter designated as "units-keys" and "tens-keys," one of the units and one of the tens keys being used to complete each circuit, which admits of one hundred combinations therewith. There are, however, only a limited number of the sliding bars and drops shown; but in a complete machine there would be one hundred drops and one hundred sliding bars in each series. Each of the latter connects to one side of a telephone-circuit, while the insulated cross-bars with which the sliding bars connect are shown complete, as there are only ten in each series, designated as "units" and "tens" series, each of these cross-bars in a complete machine being connected with one side of ten circuits, (though in the drawings these insulated cross-bars are only shown as connected with one circuit each,) as it is through these bars that the combinations are formed for connecting the different circuits.

The invention is hereinafter fully set forth and explained, and illustrated in the accompanying drawings, in which—

Figure 1 is a top or plan view of a section of my improved telephone-exchange mechanism, parts thereof being broken away. Fig. 2 is a side view, partially in elevation and partially in section, of the same. Fig. 3 is a transverse section of the same on the line $xx$ in Fig. 2, looking in the direction of the arrow $a$. Fig. 4 is a transverse section of the same on the line $xx$, looking in the direction of the arrow $b$. Fig. 5 is a diagrammatic view of the connections of a series of telephones therewith.

In the construction of my invention thus illustrated, A is the base-plate of the frame of the machine, upon one end of which are secured standards A', which support bearings $a$ $a'$ of transverse shafts $A^2$ and $A^3$ and bearings $b$ $b'$ of screws B B B' B'. (See Figs. 1, 2, and 4.) On the shafts $A^2$ and $A^3$ are loose gear-wheels $A^4$ and $A^5$, which intermesh with each other and are driven by a pinion C on a shaft C', driven by any convenient motive power, which intermeshes with the gear-wheel $A^4$. These gear-wheels $A^4$ and $A^5$ are connected with the shafts $A^2$ and $A^3$ by means of electrically-operated friction-clutches D and D', hereinafter described, connected with the shafts $A^2$ and $A^3$. The ends of the shafts $A^2$ and $A^3$ are provided with bevel-gears $a^2$ $a^2$ and $a^3$ $a^3$, which intermesh with bevel-gears $b^2$ $b^2$ and $b^3$ $b^3$ on the ends of the screws B B and B' B'. The screws B B are right and left hand screws and have traveling nuts $B^2$ $B^2$ thereon, connected together by a transverse bar $B^4$, and the screws B' B' are right and left hand screws and have traveling nuts $B^3$ $B^3$ thereon, connected together by a transverse bar $B^5$, so that the screws $B^2$ $B^2$ and $B^3$ $B^3$ when rotated by the gearing move the nuts thereon and their connecting-bars forward as the screws are rotated. On one end of each of the shafts $A^2$ and $A^3$ are spools $a^4$, around which cords $a^5$ pass and connect with weights $a^6$ $a^6$, which operate to reverse the motion of the shafts $A^2$ and $A^3$ when the clutches D and D' are released, and thereby rotate the screws B B and B' B' in the opposite direction, so as to move the nuts $B^2$ $B^2$ and $B^3$ $B^3$ back to their normal position, as shown in Figs. 1 and 2.

On the central portion of the base A there is secured an upright bearing E, and on the rear end of the base A is secured an upright bearing F. Extending between the upper portions of these bearings E and F there is a board or platform G, upon which is secured a series of upright magnets $g$, as and for the purpose hereinafter set forth, and below this platform G there are two platforms H and H' of non-conducting material, to the upper surfaces of each of which are secured ten transverse bars $h$, indicating units, and ten transverse bars $h'$, indicating tens, insulated from each other, and wires $h^2$ and $h^3$ connect out of each of said bars with the wires $n^4$ and $n^5$, connecting with the lines to subscribers' telephones. These connections, as shown, are merely illustrative of the connections which can be made, as each of the units-bars $h$ and each of the tens-bars $h'$ represent one side of ten telephone-circuits, as through these two series of bars connections are made through series of bars I I' and the sliding brushes I² and I³ for a hundred circuits. Above each of these rows of transverse bars $h$ and $h'$ are rows of longitudinal bars I, indicating units, and I' indicating tens, there being a units-bar and a tens-bar for each subscriber. These bars pass through slots $e$ and $e'$ in the upright E and slots $f$ and $f'$ in the upright F, and on the front of the upright E are small spring-dogs $e^2$ and $e^3$, adapted to engage notches $i$ and $i'$ in the under sides of the longitudinal bars I and I', as and for the purpose hereinafter set forth. The slots $e$ and $e'$ in the upright E, it will be observed, extend both above and below the bars I and I', so as to permit the front ends of these bars to be raised and lowered, as and for the purpose hereinafter set forth. Secured to the under side of each of the longitudinal bars I and I' and insulated therefrom, just in the rear of the upright E, are brushes I² and I³, adapted to contact with the upper surfaces of the transverse bars $h$ and $h'$ as the bars I and I' are moved rearwardly, and passing through insulated supports $f^2$ and $f^3$ in the rear upright F are rods J and J', one for each brush I² and I³, on which said brushes slide freely, and from the rear end of each of said rods J a wire $j$ extends to and forms one side of a telephone-circuit, and from the rear ends of each of said rods J' a wire $j'$ extends to and forms the other side of a telephone-circuit, so that each pair of rods J J' and the wires $j$ $j'$ therefrom form two sides of an open circuit to one telephone, as illustrated in Fig. 2, which circuit is adapted to be connected to any other like circuit by means of the sliding brushes I² and I³ being moved into engagement with the insulated cross-bars $h$ $h'$, ends of which bars each connect through wires $h^2$ and $h^3$, through lines $n^4$ and $n^5$, with the wires $j$ and $j'$ of ten telephones, as is hereinafter more fully set forth.

In the upright E, in line with each of the longitudinal bars I and I', are vertical recesses in which short rods $k$ $k'$ $k^2$ operate, the upper end of the rod $k$ connecting with the under surfaces of the bars I and extending down through openings in the base, as and for the purpose hereinafter set forth, spiral springs $k^3$ being placed thereon, as and for the purpose hereinafter set forth. On the lower end of each of the rods $k$ there is an insulated block K, which engages with a pair of contact-strips N N', and above these contact-strips N N' are contacts $n$ $n'$, with which each pair of said contact-strips is adapted to contact when raised, and from these strips wires $i^2$ and $i^3$ connect with the central office operator's telephone, and below the contact-strips N N' are contacts N² and N³, with which each pair of said contact-strips is adapted to contact when depressed, and from these contacts N² and N³ wires $n^2$ and $n^3$ extend to an office-magneto O, and from each pair of the contact-strips N N' wires $n^4$ and $n^5$ extend to and connect with the telephone-wires $j$ and $j'$, as well as with wires $h^2$ and $h^3$ from the insulated bars $h$ $h'$, and also with a pair of the magnets $g$, as illustrated in Fig. 2. The rods $k'$ extend from the upper sides of the longitudinal bars I upward and contact with the under sides of the longitudinal bars I', and the upper sections $k^2$ thereof extend from the upper surfaces of the bars I' upward until they contact with cam-surfaces $l$ on the lower ends of vertical drop-bars L, (only a portion of which are shown in the drawings,) pivoted on a rod L', there being one of these drops for each subscriber. Pivoted at the top of the upright F are a series of bars M. These bars M extend forward through slots $l'$ in the vertical drops L, where they are provided with hooks $m$ on their upper surfaces adapted to engage the slots $l'$ and retain the drops L in their normal upright position. Each of these bars M forms the armature for a pair of the magnets $g$, and when such pair of magnets is excited by the admission of an electrical current thereto the armature M is drawn downward, so as to release the drop L from the hook $m$, which allows the drop so released to fall forward, relieving the pressure of the cam-surface $l$ thereon from the top of the rod $k^2$. The spring $k^3$ now operates to raise the rods $k$, $k'$, and $k^2$ and at the same time raises the front ends of the longitudinal bars I and I', with which said rods contact, into the position illustrated by the dotted lines in Fig. 2, and at the same time raises the pair of contact-strips N N' into contact with the conductors $n$ $n'$, putting the central operator's telephone into circuit with the calling telephone.

On a plate P are located two series of push-buttons, one series P' designated as "units" and the other series P² as "tens." Hinged to the under side of the plate P are two bars $p$ and $p'$. (See Figs. 1, 2, and 4.) The push-buttons P' pass through the bar $p'$ and are normally insulated therefrom, and the push-buttons P² pass through the bar $p$ and are normally insulated therefrom. On the lower end of each of these push-buttons there is a contact-surface $p^2$, adapted to form an electrical connection with the bars $p$ or $p'$, as the case may be, when such bar is depressed. Under the outer end of the bar $p$ there is a contact Q, with which the end of said bar engages when depressed. Under the outer end of the bar $p'$ there is a contact Q', with which the end of said bar engages when depressed. From the contact Q a wire extends to a battery $Q^2$ and thence to a brush R, which contacts with an insulated ring $d'$ on the hub of the clutch D', another brush $d^2$ forming the connection between said ring $d'$ and the magnet in said clutch, the other end of the wire from said magnet being grounded in the hub of said clutch, and from the contact Q' a wire extends to a battery $Q^3$ and thence to a brush R', which contacts with an insulated ring $d^3$ on the hub of the clutch D, another brush $d^4$ forming the connection between said ring $d^3$ and the magnet (not shown) in said clutch, the other wire from said magnet being grounded in the hub of said clutch.

From the contact-surfaces $p^2$ of the push-buttons P' wires $y$ extend to insulated contact-surfaces S on a horizontal bar S' at one side of the machine, parallel with and adjacent to one of the screws B, and on the nut $B^2$, operating thereon, there is a contact-brush $S^2$, adapted to travel over the contact-surfaces S and form a connection between them and the frame of the machine, and from the contact-surfaces $p^2$ of the push-buttons $P^2$ wires $z$ extend to insulated contact-surfaces $S^3$ on a horizontal bar $S^4$ at one side of the machine, parallel with and adjacent to one of the screws B', and on the nut $B^3$, operating thereon, there is a contact-brush $S^5$, adapted to travel over the contact-surfaces $S^3$ and form a connection between them and the frame of the machine. These figures are shown in Figs. 1, 2, and 4.

In operation it will be seen that when the operator depresses one of the push-buttons in either series—say, for example, 5 in the ten series, the bar $p$ will be depressed until it contacts with all of the contacts $p^2$ on said buttons except the one depressed, and also with the contact Q. A circuit will then be set up through the battery $Q^2$ and the magnet in the clutch D' to the frame of the machine, and thence through the brush $S^5$ to the first of the contact-surfaces $S^3$, upon which it is normally at rest, and back through the wire $z$ to the bar $p$, which being a complete circuit will energize the magnet in the clutch D', attract the gear-wheel $A^5$, acting as an armature therefor, and set the shaft $A^3$ in motion, which will rotate the screws B' B' and move the nuts $B^3$ $B^3$ forward. This movement will continue until the brush $S^5$ reaches contact-surface $S^3$, corresponding with the button 5 depressed, when the circuit will be broken and the clutch then ceasing to be operative the mechanism stops. Now if during this operation any of the horizontal bars I' are raised into the position shown by the dotted lines in Fig. 2 they will be pushed back by the cross-bar $B^5$, connecting the nuts $B^3$ $B^3$, until the brush I' thereon is in contact with the insulated cross-bar $h'$, corresponding to the key depressed, and if one push-button in each series is depressed both sets of screws will be revolved and the brushes on the bars moved back in each series and will contact with the cross-bar in each of the series $h$ and $h'$, as indicated by the numbers of the buttons in each series so depressed. It will be observed that the subscriber's telephone T is connected through the wires $j$ $j'$ and rods J and J' with the brushes $I^2$ and $I^3$, and also through the lines $j$ $j'$ and wires $n^4$ and $n^5$ and $h^2$ and $h^3$ with one pair of the insulated bars $h$ and $h'$, and each subscriber's telephone is connected up with one pair of said rods, brushes, and bars in like manner. Now if a subscriber rings up the central office the wires $n^4$ and $n^5$, connecting with two of the magnets $g$, convey the current from his magneto to said magnets and causes the drop L corresponding to his number to fall. This releases the spring $k^3$ and raises the rods $k$, $k'$, and $k^2$, also raises the front ends of the longitudinal bars I and I', as shown in dotted lines in Fig. 2, and also raises therewith the contact-strips N N' into contact with the conductors $n$ $n'$, from which the wires $i^2$ and $i^3$ lead to the central telephone. The operator then asks the number desired, and when informed the buttons P' $P^2$, indicating the number called for, are depressed, and bars I I', corresponding to the number of the caller, are moved back by the operation of the mechanism hereinbefore described until the brushes $I^2$ and $I^3$ thereon contact with the bars $h$ and $h'$, corresponding with the numbers of the buttons depressed, where the push-buttons corresponding to the bars moved being replaced they are retained by the cross-bars $B^4$ and $B^5$, and the two telephones—the caller and called for—are by this movement connected up ready for conversation. The caller's drop L is then raised into place, which depresses the bars I I' until they engage the spring-dogs $e^2$ and $e^3$, after which the called drop L is pushed back, as shown by the dotted lines in Fig. 2, and this movement of the drop causes the cam-surface $l$ on the drop to depress the rods $k^2$, $k'$, and $k$ of the number called for, which forces the contact-strips N N' of that number into contact with the conductors $N^2$ and $N^3$, from which wires $n^2$ and $n^3$ connect the office-magneto O into circuit with the person called for and rings his bell. Conversation can then be carried on between the caller and called until the party calling rings off, which causes his drop to fall. This releases the bars I I' of the caller, which has been moved back to connect him with the called, and the weights U $U^2$ instantly return them to their normal positions, disconnecting the caller and party called for.

In the drawings Figs. 1, 2, 3, and 4 I have shown a section of my apparatus embodying only a portion of the parts of a complete telephone-exchange mechanism adapted to operate a hundred telephone-circuits, and which fully illustrates the invention and its operation.

In Fig. 5 I have shown a diagrammatic drawing illustrating the connections of telephones by means of the mechanism of my device. This diagram, however, does not illustrate a full apparatus, as only a small portion of the bars and connections of a complete exchange mechanism are shown, the object of the diagram being only illustrative and explanatory of the mechanism hereinbefore described. In this drawing the dark bars $h$ and $h'$ are the insulated bars, $h$ and $h'$ indicating units and tens bars, (shown in Figs. 1 and 2,) and the light bars I and I' are the longitudinally-moving bars indicating the units and tens bars I I', (illustrated in Figs. 1, 2, 3, and 4,) and the small dots $I^2$ and $I^3$ thereon indicate the brushes $I^2$ and $I^3$. (Shown in Figs. 1 and 3.) The office-telephone and its connecting-wires $i^2$ and $i^3$, connecting with the contacts N N', are the same as shown in Fig. 2. The office-magneto and its connections $n^2$ and $n^3$, with the contacts $N^2 N^3$, illustrate the connections shown in Fig. 2, while the parts N N' indicate the contact-strips operated by the drop mechanism shown in Figs. 2, 3, and 4. The wires connecting the several telephones T T with the bars $h\ h'$ and the bars I I' illustrate, diagrammatically, the connections of the telephones therewith, as shown in the preceding figures. Referring to diagrammatic Fig. 5, suppose telephone T' calls up the central. His drop falling connects the office-phone with him, as hereinbefore described. The operator, ascertaining that he desires to talk with telephone $T^5$, moves the bars I and I' so that the brushes $I^2$ and $I^3$ thereon contact with the central bars $h\ h'$, as indicated by $x\ x$. The telephones T' and $T^5$ are then connected and the operator calls $T^5$, and the parties then are in communication with each other, and in like manner any two of any number of telephones so arranged can be connected.

I have thus shown convenient mechanism for carrying out my invention. I am aware, however, that many parts thereof can be modified in their construction without departing from the spirit of my invention; therefore

What I claim as new, and desire to secure by Letters Patent of the United States, is—

1. In a telephone-exchange mechanism, two series of bars, one series of which represents units and the other series tens, each of which connects with wires forming one side of telephone-circuits, two other series of bars, one series of which represents units and the other tens, each of which is adapted to be moved transversely across the corresponding first-named series, each of which second two series of bars also connects with wires forming the other side of such telephone-circuits, brushes on each of the bars of said last-named two series adapted to connect with bars in the first-named corresponding series, and means for moving said second two series of bars longitudinally across said first-named two series of bars, substantially as set forth.

2. In a telephone-exchange mechanism, two series of bars, one series of which represents units and the other tens, each of which bars is connected with wires forming one side of telephone-circuits, two other series of bars, one series of which represents units and the other tens, each of which bars connects with wires forming the other side of such telephone-circuits each of said last-named two series being adapted to be moved longitudinally across the one of the first-named two series corresponding therewith, brushes on the bars of the last-named two series adapted to contact with the bars in the corresponding first-named series when moved across them as above described, signaling and drop mechanism connected in circuit with the lines to and from the telephones connected with said lines, and mechanism for moving the bars in said second-named two series across the first-named two series, substantially as set forth.

3. In a telephone-exchange mechanism, an office-telephone normally out of connection with all of the subscribers' telephones, drop mechanism comprising means adapted to be operated by the caller's ring and automatically connect such calling telephone with the operator's office-telephone, and mechanism connected with said drops adapted when a drop is pushed back to ring up a telephone called for, substantially as set forth.

4. In a telephone-exchange mechanism, bars I I' connected in telephone-circuits, telephone drop mechanism comprising means for engaging said bars, so constructed as to raise the bars communicating with the caller's telephone when the drop falls in response to the caller's ring and means released by the drop for automatically connecting the caller's telephone with the operator's telephone, substantially as set forth.

5. In a telephone-exchange mechanism, a set of longitudinally-movable bars, having contact-brushes thereon connected with wires forming one side of telephone-circuits, and adapted to be moved longitudinally across a set of transverse bars connected with wires forming the other side of said telephone-circuits, so that said brushes will contact therewith, drop mechanism for automatically raising each of said longitudinally-movable bars when the drop connected therewith is operated, mechanism for moving the longitudinal bars in one direction when so raised, push-button, contact and battery mechanism for starting, keeping in motion and stopping said actuating mechanism, dog mechanism for retaining the bars in the positions to which they are so moved, and weight mechanism for reversing and moving back said actuating mechanism, mechanism connected with the drop for releasing the bar so moved forward, and weight mechanism for returning the bars when so released to their normal position, substantially as set forth.

6. In a telephone-exchange mechanism, two sets of longitudinally-movable bars, each set of which have brushes connected with wires forming one side of telephone-circuits and adapted to contact with corresponding sets of transverse bars connected with wires forming the other sides of said telephone-circuits, drop mechanism for automatically raising the longitudinal bars in both sets thereof corresponding with each drop, actuating mechanism for simultaneously moving the bars in both sets when so raised longitudinally in one direction, push-button, contact, battery and clutch mechanism for starting, keeping in motion and stopping said actuating mechanism, dog mechanism for retaining said bars in the positions to which they are so moved, weight mechanism for moving the actuating mechanism in the reverse direction, mechanism connecting the drops with the bars corresponding thereto for simultaneously releasing the bars so moved forward from the dogs, and weight mechanism connected with the bars for simultaneously moving them back when so released to their normal positions, substantially as set forth.

7. In a telephone-exchange mechanism, units transverse bars $h$, tens transverse bars $h'$, wires $h^2$ and $h^3$ connecting with telephone-circuits, units longitudinally-movable bars I, tens longitudinally-movable bars I', brushes $I^2$ and $I^3$ on said movable bars I I', and rods J and J' and wires $j\ j'$ connecting said brushes with telephone-circuits, drops L and rods $k^2$ $k'\ k$ connecting with the bars I I' and operated by the cam-surfaces on said drops for moving said rods in one direction, and a spring $k^3$ operating said rods in an opposite direction, lever-catches M and magnets $g$ for releasing said drops L, an insulated block K on the lower end of the rod $k$ and contact-strips N N' actuated thereby, substantially as and for the purpose set forth.

8. In a telephone-exchange mechanism, lines $n^4$ and $n^5$ connecting the subscriber's telephone with magnets $g\ g$ and with transverse bars $h\ h'$, conductors $n\ n'$ connected by wires $i^2$ and $i^3$ with the operator's office-telephone, conductors $N^2$ and $N^3$ connected by wires $n^2$ and $n^3$ with the office-magneto O, contact-strips N N' connected with the lines $n^4$ and $n^5$ adapted to contact with the conductors $n\ n'$ or the conductors $N^2$ and $N^3$ and the rods $k\ k'$ and $k^2$ and the drop L and spring $k^3$ for operating said contact-strips N N', substantially as and for the purpose set forth.

9. In a telephone-exchange mechanism, gear and clutch mechanism and screws operated thereby, nuts on said screws connected by transverse bars, two series of push-buttons P' P², contact-points $p^2$ on said push-buttons, wires $y$ and $z$ from said contact-points to contacts S and S³, brushes S² and S⁵ on the nuts B² and B³ adapted to contact with said contacts S and S³, contact-plates $p$ and $p'$ adapted to be actuated by said push-buttons P' and P² and contact with the contact-points $p^2$ thereon and with contacts Q and Q' connecting with batteries Q² and Q³, and thence to and through the magnets in the clutches D and D', and thence to the machine-frame, substantially as and for the purpose set forth.

In testimony whereof I affix my signature in presence of two witnesses.

HARLEN P. SNOW.

Witnesses:
FRED. EINFELDT,
A. L. JACKSON.